United States Patent [19]

Hayakawa et al.

[11] Patent Number: 5,415,491
[45] Date of Patent: May 16, 1995

[54] COUPLING DEVICE

[75] Inventors: Hatsuo Hayakawa; Mikio Honma, both of Yokohama, Japan

[73] Assignee: Ohi Seisakusho Co., Ltd., Yokohama, Japan

[21] Appl. No.: 107,142

[22] Filed: Aug. 17, 1993

[30] Foreign Application Priority Data

Aug. 28, 1992 [JP] Japan .................................. 4-251975

[51] Int. Cl.⁶ .......................... E05B 3/00; B60N 2/00
[52] U.S. Cl. .................... 403/316; 403/315; 403/300; 24/616; 24/662; 292/336.3; 292/348; 297/378.12
[58] Field of Search ............... 403/315, 316, 300, 314, 403/353; 24/662, 671, 616, 615; 292/348, 355, 336.3; 297/378.12

[56] References Cited

U.S. PATENT DOCUMENTS

| | | | |
|---|---|---|---|
| 2,858,593 | 11/1958 | Irizarry | 24/616 |
| 2,999,125 | 9/1961 | Young | 403/316 |
| 5,328,243 | 7/1994 | Akiyama | 292/336.3 |

FOREIGN PATENT DOCUMENTS 60-171751 11/1985 Japan .

Primary Examiner—Randolph A. Reese
Assistant Examiner—Anthony Knight
Attorney, Agent, or Firm—Foley & Lardner

[57] ABSTRACT

A coupling device for connecting a wire and a knob of elastic material is disclosed. The wire has one end formed into a hook and a portion curved into a generally U shape and connecting to the hook. The knob has a bore receiving the wire and a wall portion surrounding the bore. The wall portion is formed with a slot engaged by the hook, and a bulge protruding into the bore and engaged with the U-shaped portion of the wire. The bulge is so constructed and arranged as to prohibit removal of the U-shaped portion of the wire from the bore after the bulge has allowed insertion of the U-shaped portion into the bore.

6 Claims, 3 Drawing Sheets

COUPLING DEVICE

BACKGROUND OF THE INVENTION

The present invention relates to a coupling device for connecting a wire member with a knob member.

Japanese Utility Model Application First Publication No. 60-171751 discloses a coupling device for coupling an actuator knob with a connecting bar by means of fastening members which include a bolt and a spring washer. The connecting rod is connected at one end thereof with the actuator knob and at the other end thereof with a latch assembly for locking a reclining rear seat in position. The latch assembly is driven via the connecting rod by operating the actuator knob.

SUMMARY OF THE INVENTION

An object of the present invention is to provide an improved coupling device for easily coupling a wire member with a knob member without using the fastening members as disclosed in the conventional coupling device, and for preventing a removal of the wire member from the knob member.

According to one aspect of the present invention, there is provided a coupling device comprising:

- a wire having one end formed into a hook and a portion curved into a generally U shape and connecting into the hook; and
- a knob of elastic material, the knob having a bore and wall means defining the bore, the bore receiving the wire, the wall means being formed with a slot engaged by the hook;
- the knob including a bulge protruding into the bore and engaged with the portion of the wire;
- the bulge being so constructed and arranged as to prohibit removal of the portion of the wire from the bore after the bulge has allowed insertion of the portion of the wire into the bore.

According to another aspect of the present invention, there is provided a coupling device comprising:

- a wire having one end formed into a hook and a portion curved into a generally U shape and connecting into the hook; and
- a knob of elastic material, the knob having a bore and wall means defining said bore, the bore receiving the wire, the wall means being formed with a slot engaged by the hook;
- the hook and the portion of the wire being so disposed as to be present in a same plane;
- the knob including a bulge protruding into the bore;
- the bulge being formed with a shoulder portion which is so configured as to mate with the portion of the wire, and a guide face slanting relative to the shoulder portion and guiding the portion of the wire until engagement of the portion of the wire with the shoulder portion.

DESCRIPTION OF THE PREFERRED EMBODIMENT

Figure 1:
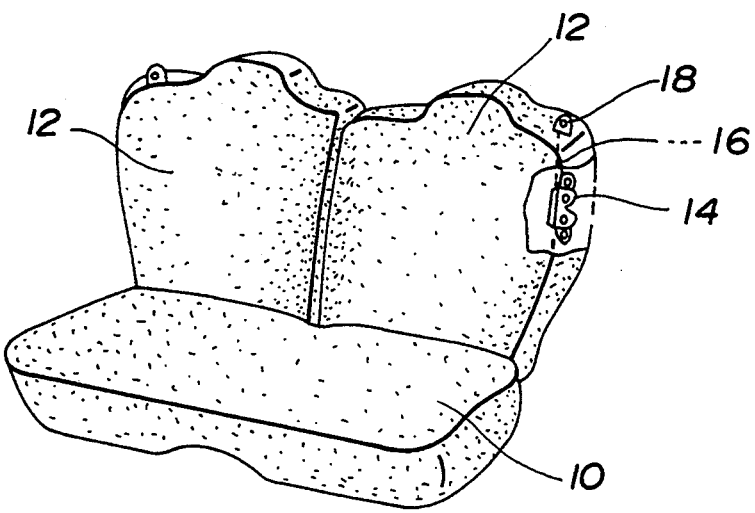
FIG. 1 is a schematic perspective view, partially broken away, of a reclining rear seat of a vehicle, to which a coupling device according to the present invention is incorporated.

Referring now to FIG. 1, there is shown a schematic perspective view of a reclining rear seat of a vehicle to which a coupling device according to the present invention is adapted. The reclining rear seat comprises a seat cushion 10 supported on a vehicle floor (not shown) and two seat backs 12 which are supported on the seat cushion 10 in an angularly displaceable relation thereto, respectively. A latch assembly 14 is mounted on each of the seat backs 12 on right and left hand sides as viewed in FIG. 1, but only the latch assembly 14 on the right seat back 12 is shown in FIG. 1. The latch assembly 14 has a locking position where the seat back 12 is locked at a predetermined angular position relative to the seat cushion 10. The latch assembly 14 is operatively connected via a resilient steel wire 16 as shown in a phantom line in FIG. 1, to an actuator knob 18 which is mounted on a top wall of the seat back 12. The latch assembly 14 is released from the locking position by operating the actuator knob 18.

Figure 2:
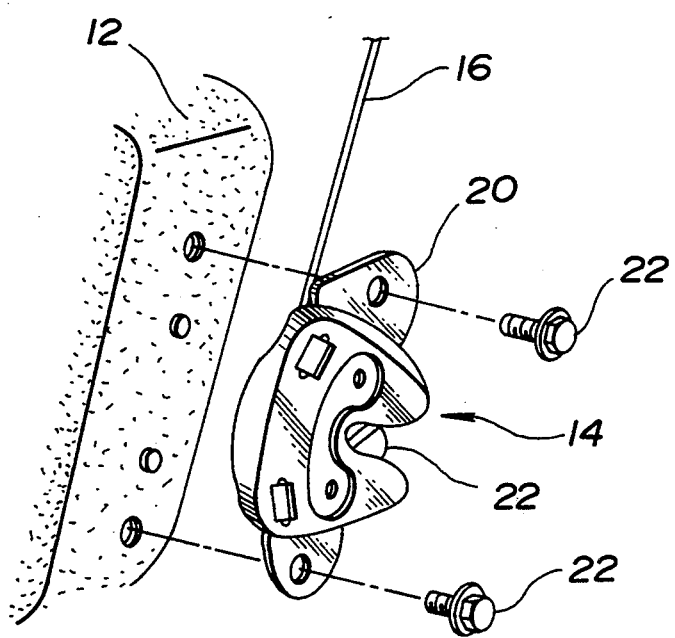
FIG. 2 is an enlarged view of a latch assembly dismounted from the seat, showing a part of a wire connected at one end thereof with the latch assembly.

As best seen in FIG. 2, the latch assembly 14 includes a base plate 20 secured by means of bolts 22 to a side wall of the seat back 12. A latch 24 is pivotally supported on the base plate 20 and engaged with a striker (not shown) secured to the vehicle body. The engagement between the latch assembly 14 and the striker allows the seat back 12 to be locked at a predetermined angular position thereof relative to the seat cushion 10. The latch 24 is operatively connected via a locking plate (not shown) to one end of the wire 16.

Figure 3:
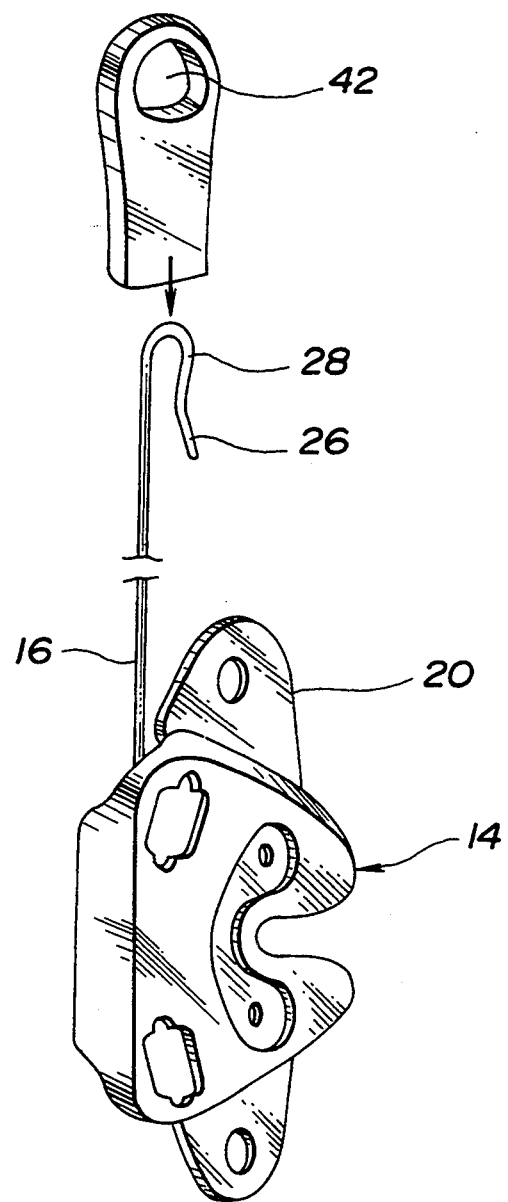
FIG. 3 is a perspective view of an actuator knob and the wire connected with the latch assembly.
Figure 4:
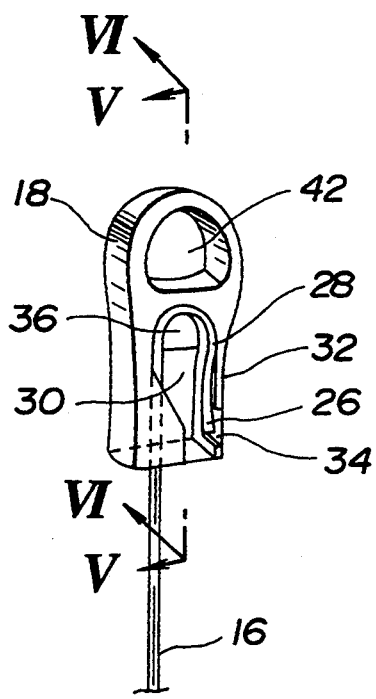
FIG. 4 is a perspective view, partially broken away, of the actuator knob which is connected with the other end of the wire.
Figure 5:
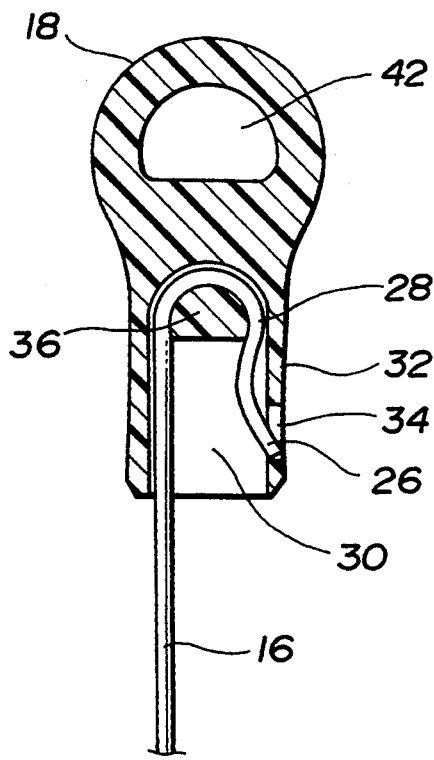
FIG. 5 is a longitudinal sectional elevation taken along the line V—V of FIG. 4.

As seen in FIGS. 3 to 5, the wire 16 has the other end which is formed into a hook 26 and a portion 28 which is curved into a generally U shape and connected to the hook 26. The hook 26 and the U-shaped portion 28 are so arranged as to be present in a same plane. The other end of the wire 16 with the hook 26 and the U-shaped portion 28 is inserted into a bore 30 of the actuator knob 18.

The actuator knob 18 is made of elastic material such as synthetic resin and includes a circular upper body portion and a rectangular lower body portion connected thereto as seen in FIGS. 3 to 6. The lower body portion includes a wall portion 32 which defines the bore 30. The wall portion 32 includes two opposite end walls one of which is formed with a slot 34 in the vicinity of a lower end thereof as viewed in FIGS. 4 and 5. The slot 34 communicates with the bore 30 and is engaged by the hook 26 of the wire 16 after the U-shaped portion 28 is inserted into the bore 30.

Figure 6:
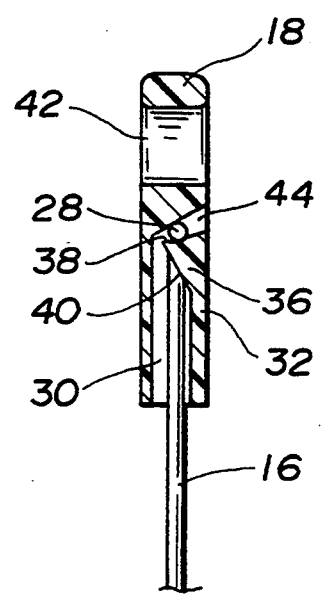
FIG. 6 is a longitudinal sectional view taken along the line VI—VI of FIG. 4.

As shown in FIGS. 3 to 6, the wall portion 32 of the actuator knob 18 also includes two opposite side walls. One of the side walls is formed on an inside surface thereof with a bulge 36 which projects into the bore 30. There is a clearance between an angulate end of the bulge 36 and an inside surface of the opposite side 25 wall as seen in FIG. 6. The clearance is defined such that the U-shaped portion 28 is allowed to pass through when the bulge 36 is elastically deformed by an urging force of the U-shaped portion 28 upon its insertion into the bore 30.

As best shown in FIGS. 5 and 6, the bulge 36 is of a generally semicircular shape and formed with a curved shoulder portion 38 extending along the generally semicircular periphery. The shoulder portion 38 is configured to mate with the U-shaped portion 28 of the wire 16 after insertion of the U-shaped portion 28 into the bore 30. A surface of the shoulder portion 38 is in substantially perpendicular relation to the inside surface of the side wall as seen in FIG. 8. Thus, the U-shaped portion 28 is engaged and retained by the shoulder portion 38 as seen in FIG. 6. The shoulder portion 38 is connected to a guide face 40 which is slanted relative to the inside surface of the side wall and the surface of the shoulder portion 38 as seen in FIG. 6. The guide face 40 contacts the U-shaped portion 28 of the wire 16 when the U-shaped portion 28 is initially inserted into the bore 30. In FIG. 6, reference numeral 44 denotes a space which serves for a removal of a mold core used in a molding process of the bulge 36.

The circular upper body portion of the actuator knob 18 has an opening 42 into which an occupant of the seat inserts fingers to thereby operate the actuator knob 18. The actuator knob 18 is operated to be drawn upward from the top wall of the seat back 12 or depressed downward thereinto.

When the actuator knob 18 is assembled with the wire 16, the U-shaped portion 28 of the wire 16 is inserted into the bore 30. Then, the hook 26 of the wire 16 is resiliently bent inward along the inside surface of the end wall of the actuator knob 18. The U-shaped portion 28 is contacted with the guide face 40 of the bulge 36 and moved upwardly as viewed in FIG. 6.

The U-shaped portion 28 is moved beyond the guide face 40 to be engaged by the shoulder portion 38 of the bulge 36 and retained thereon. The bulge 36 serves for prohibiting a removal of the U-shaped portion 28 of the wire 16 from the bore 30 of the actuator knob 18 after the bulge 36 has allowed insertion of the U-shaped portion 28 of the wire 16 into the bore 30 of the actuator knob 14.

Simultaneously with the engagement between the U-shaped portion 28 and the bulge 36, the slot 34 is engaged by the hook 26 of the wire 16. The engagement of the slot 34 with the hook 26 limits a movement of the wire 16 in the bore 30 in a direction substantially perpendicular to the plane in which the hook 26 and the U-shaped portion 28 of the wire 16 are disposed.

Thus, the U-shaped portion 28 is prevented from a displacement on the bulge 36 by the engagement of the slot 34 with the hook 26, and therefore avoids a removal of the wire 16 from the bore 30. Accordingly, the wire 16 is surely coupled at the end with the actuator knob 18.

What is claimed is:

1. A coupling device comprising:
   a wire having one end formed into a hook and a portion curved into a generally U shape and connecting into said hook; and
   a knob of elastic material, said knob having a bore and wall means defining said bore, said bore receiving said wire, said wall means being formed with a slot engaged by said hook;
   said knob including a bulge protruding into said bore and engaged with said portion of said wire;
   said bulge being so constructed and arranged as to prohibit removal of said portion of said wire from said bore after said bulge has allowed insertion of said portion of said wire into said bore.

2. A coupling device as claimed in claim 1, wherein said wire includes a resilient steel wire.

3. A coupling device as claimed in claim 1, wherein said hook and said portion of said wire are so disposed as to be present in a same plane.

4. A coupling device as claimed in claim 1, wherein said bulge includes a shoulder portion which is so configured as to mate with said portion of said wire, and a guide face slanting relative to said shoulder portion and guiding said portion of said wire until engagement of said portion of said wire with said shoulder portion.

5. A coupling device comprising:
   a wire having one end formed into a hook and a portion curved into a generally U shape and connecting into said hook; and
   a knob of elastic material, said knob having a bore and wall means defining said bore, said bore receiving said wire, said wall means being formed with a slot engaged by said hook;
   said hook and said portion of said wire being so disposed as to be present in a same plane;
   said knob including a bulge protruding into said bore;
   said bulge being formed with a shoulder portion which is so configured as to mate with said portion of said wire, and a guide face slanting relative to said shoulder portion and guiding said portion of said wire until engagement of said portion of said wire with said shoulder portion.

6. A coupling device as claimed in claim 5, wherein said wire includes a resilient steel wire.

* * * * *